Dec. 13, 1966   F. T. BYRNE   3,292,102
PULSED OPTICAL BEAM GENERATOR
Filed Dec. 14, 1962
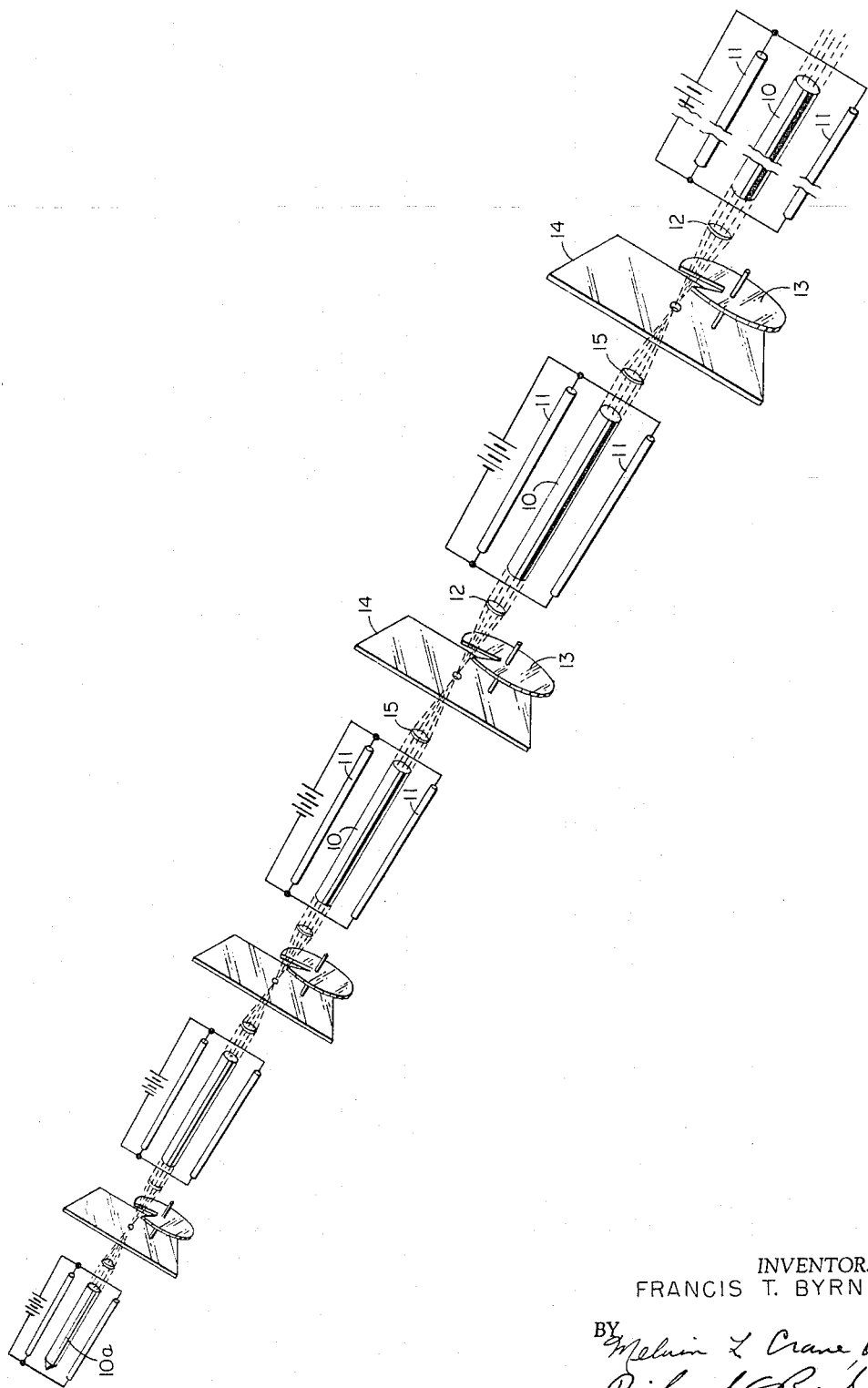
INVENTOR.
FRANCIS T. BYRNE
ATTORNEY

United States Patent Office 3,292,102
Patented Dec. 13, 1966

3,292,102
PULSED OPTICAL BEAM GENERATOR
Francis T. Byrne, 123 Hamilton Ave., Silver Spring, Md.
Filed Dec. 14, 1962, Ser. No. 246,863
4 Claims. (Cl. 331—94.5)

The invention described herein may be manufactured and used by or for the Government of the United States of America for governmental purposes without the payment of any royalties thereon or therefor.

The present invention relates to a laser system capable of generating a high intensity, essentially monochromatic optical pulsed beam.

A laser (*l*ight *a*mplification by *s*timulated *e*mission of *r*adiation), sometimes referred to as an optical maser, is a device capable of producing coherent radiation in an intense and extremely narrow beam of light including ultraviolet, visible and infrared regions of the spectrum. This optical frequency electromagnetic radiation beam is produced by means of stimulated emission of radiation from atoms, ions, or molecules in an excited energy level. These atoms, ions, or molecules which comprise the active species in the laser material may be held in any suitable host (gas, liquid, or solid). An important ingredient to the successful operation of a laser is a method of obtaining a larger number density of the active species in some higher energy level than there are in a lower (not necessarily the lowest) energy level. Only when this condition exists can the process of stimulated emission give rise to the emission of more radiation than that lost through the process of absorption. There are many methods of obtaining this inversion in the number density of the active species including: optical pumping as has been done with ruby, neodymium glass, a plurality of rare earth crystals and glasses, and with cesium gas; direct electrical injection of charges into excited states has been used with gallium arsenide; resonant energy transfer as has been used with helium neon lasers and other gas mixtures. The present device is described in terms of using optical pumping to obtain a large number of the active species in an excited energy level. Ordinarily atoms spontaneously fall from the higher energy level to a lower energy level which may be the ground level yielding normal luminescence. However, in the laser the atoms in the upper energy level are stimulated by a light at a frequency similar to that which the atoms would normally emit spontaneously resulting in the atoms making the jump more readily. In jumping from the upper energy level to the lower energy level light is given off. An intense radiation builds up, and continues as long as the population of atoms in the upper energy level is constantly restored. The light which is stimulated moves in the same direction as the stimulating light, therefore the only light that is strongly amplified is that which moves parallel to the axis of the laser. Therefore the output beam which is transmitted has almost all of its intensity in a very narrow cone.

Heretofore various systems have been reported for generating high intensity pulsed beams (pulses of less than 1 microsecond duration) limited inherently to about 20 joules total power per square centimeter which can perhaps be amplified by about a factor of two. These systems employ large pulsed laser oscillators or a small pulsed oscillator followed by one or more stages of amplification in laser power amplifiers. These systems have drawbacks in the available means by which the stages are coupled together and the inherent limitations of presently reported materials.

It is therefore an object of the present invention to provide a pulsed optical beam generator for generating a high intensity, essentially monochromatic beam.

Another object is to control the angular spread of the output beam of a laser system.

Still another object of this invention is to provide mode selection between amplifier stages.

Yet another object is to provide a relatively simple laser system including control switches between amplifier sections.

Other objects and advantages of the invention will hereinafter become more fully apparent from the following description of the drawing, which illustrates the preferred embodiments, and wherein:

The drawing is a schematic view which illustrates one suitable system.

The present invention is directed to a pulsed optical beam generator system which includes a plurality of aligned laser amplifier sections spaced from each other in end-to-end relationship in a chain on an optical axis. Each of the lasers has parallel ends with one of the end lasers made one-half the length of the rest with the outer end terminated by a retro-directive prism. Each of the lasers is separated by an optical shutter or switch and a mode selector, angle limiter, or aperture. The mode selector determines the angular spread of the beam and the switches connect the various sections of the amplifier chain together in a certain time. Upon simultaneous opening of the switches, spontaneous radiation emitted in one section, passing through the mode selector is amplified in each succeeding section and after passing sufficient sections becomes intense enough to completely saturate the next amplifier section and dump all of the stored energy in the beam. This action occurs simultaneously in all sections of the amplifier chain in both a forward and backward direction. This mode of operation is called "the cannon mode" or spontaneous avalanche and the device is called a cannon pulse generator. The energy in the pulsed beam is limited by the total available stored energy in the laser material, the minimum pulse time is limited by the optical transit time required for the signal to reach the saturated stage of amplification and the maximum pulse time is determined by the number of amplifier sections in the chain (the optical transit time of going from the front section to the retro-prism and back out through the front section). The mode selectors confine the light beam emerging from the front to a small diameter wherein the light beam is of high intensity and suitable for many uses.

Now referring to the drawing, there is shown by illustration a schematic view of a suitable system for carrying out the teaching of this invention. The system includes a plurality of axially aligned laser amplifier sections positioned in end-to-end relationship such that radiation emitted by the first laser section passes through each successive section from end-to-end to the end half-section and back again. Each laser amplifier section includes a suitable laser element 10 such as ruby, neodymium glass, various rare earth materials, uranium, chromium ions in different host materials, etc., which produces a suitable output. The laser element 10 is optically pumped by any suitable light source such as one or more xenon flash tubes 11, a mercury discharge lamp, or any other suitable light source. Each of the laser elements are separated by a light focusing double-convex lens 12, a light switch 13, a mode selector 14, and a double-convex lens 15. The last laser section is formed by a laser element 10*a* which is one-half the length of the other laser elements in the chain. The laser element 10*a* terminates in a retro-directive prism which reflects the incident radiation back through the laser element chain in parallel waves.

The light switches 13 may be made as a rotating slotted disc, rotating mirror or mirrors, frustrated total internal reflector switches activated by piezo-electric or magneto-strictive elements, Kerr cell optical switches, or any other suitable fast acting optical switch that will withstand the power used. The mode selector 14 may be made as a pinhole in diamond, sapphire, glass, or metal; a slit, Fresnel zone plate, or any other suitable element with a small passage or aperture that will withstand the light energy. The light focusing lens 12 receives incident parallel light, focuses the light through the pinhole and can be made of any suitable optical glass that will withstand the power level of the system and could be even an integral part of the laser rod. The lens 15 then changes the light into parallel rays and directs the light into the end of the laser next in the chain. Obviously on the return back through the chain the lenses 15 and 12 interchange in their functions.

The laser sections are shown by illustration in axial alignment along the linear axis. The laser chain will function just as well if provided with mirrors in the system such that the laser sections are situated on an optical axis. Thus the laser amplifier sections do not need to be physically stretched out in a single line as shown.

The laser amplifier sections are made to store and deliver a maximum energy consistent with the properties of the laser material, which for ruby or neodymium glass is about $40/joules/cm.^2$ and a total power of about 1,000 joules. Other laser materials may be less or even more. The energy in the output beam is limited by the total available stored energy in the laser materials, the minimum pulse time is limited by the optical transit time required for the signal to reach the saturated stage of amplification and the maximum pulse time is determined by the length of the chain.

In operation, each laser element is optically pumped by its respective light source exciting the atoms therein to produce an output of photons from each laser element. (The principle of optically pumping a laser is well known in the art and need not be fully described herein.) During oscillation in a laser, stimulated emission decreses the mean lifetime in the upper state to less than that which is characteristic of spontaneous emission alone, thereby limiting the excess population attainable with available pumping power to not much more than the threshold value. Laser oscillators require feedback, therefore, greater population inversion can be achieved by temporarily preventing feedthrough of the light output from one laser section to another. Therefore the optical switch is operated between the laser sections. After simultaneously exciting each laser section, the optical switches are opened simultaneously permitting the spontaneous radiation emitted in one section to pass through the double-convex lens 12 which focuses the radiation through the light switch, the aperture or mode selector, through the double-convex lens and into the end of the next laser section. Starting with the full sized end laser the radiation passes to the next laser where it is amplified and then amplified in each succeeding section, and, after passing through from five to seven sections, the radiation is intense enough to completely saturate the next amplifier section and dump all of the stored energy onto the beam. This action occurs simultaneously in all of the laser amplifier sections from the first full laser section to the retro-prism and laser 10a and back through each amplifier section and out of the full sized end laser section as the output beam, all within the time that the optical switch is open. Thus, the optical switches must be synchronized to a time less than the transit time of an optical pulse between shutters.

The system has been described above to include a focusing lens and a lens to convert the light back to its original wave form. The device can be operated without these two lenses wherein the light passes through the optical switch and then through a mode selector to the next laser element in the chain, etc., until the radiation has traveled from the first laser section to the retro-directive prism-laser and back out through the entire laser section chain.

Use of about twenty sections enables one to produce a high intensity radiation beam of about 1000 joules per $cm.^2$. Such radiation can be used for welding metal; drilling holes in metal, diamonds, sapphires; cutting metal; optical radar; optical communications, and many other uses well known in the art.

Obviously many modifications and variations of the present invention are possible in the light of the above teachings. It is therefore to be understood that within the scope of the appended claims the invention may be practiced otherwise than as specifically described.

What is claimed is:

1. A system for producing a high energy pulsed beam of radiation which comprises:
   a plurality of optically aligned laser sections positioned in end-to-end spaced relationship on an optical axis, each of said sections including a laser element, a light source for exciting each of said laser elements,
   an end laser element of said plurality of laser sections including a laser element one-half the length of the remainder of said plurality of laser elements,
   an optical switch,
   and a mode selector positioned between opposing ends of each of said plurality of laser sections and wherein said laser element having one-half the length of the remainder of said laser elements comprises an inner end perpendicular to the axis through said laser element and an outer end with a retro-prism attached thereto to reflect incident light back through each of said laser sections along said optical axis.

2. A system for producing a high energy pulsed beam of radiation which comprises:
   a plurality of optically aligned laser sections positioned in end-to-end spaced relationship on an optical axis, each of said sections including a laser element, and a light source for exciting each of said laser elements;
   an end laser element of said plurality of laser sections including a laser element one-half the length of the remainder of said plurality of laser elements,
   a mode selector positioned between opposing ends of each of said laser elements,
   said mode selector including an axial passage for passing a pencil-beam of radiation,
   an optical switch positioned between each said mode selector and one end of each of said laser elements,
   means for synchronizing each of said optical switches and wherein said laser element having one-half the length of the remainder of said laser elements comprises an inner end perpendicular to the axis through said laser element and an outer end with a retro-prism attached thereto to reflect incident light back through each of said laser sections along said optical axis.

3. A high energy pulsed beam generator which comprises:
   a plurality of axially aligned laser sections positioned linearly in end-to-end spaced relationship,
   each of said laser sections except one end section including a cylindrical elongated laser element with the end faces parallel to each other and perpendicular to an axis through the ends,
   said one end section including a laser element one-half the length of the other of said laser elements,
   said half-length laser element comprising an inner end perpendicular to the axis through said laser elements and an outer end with a retro-prism,
   said retro-prism adapted to receive light from said inner end of said half-length laser and reflecting said light back through said half-length laser element and through said plurality of said laser sections,
   a pair of double-convex lenses positioned between each of said laser sections along the axis thereof, adapted to focus parallel radiation, an element positioned between said lenses at the focal point of each of said lenses, an aperture in said element with said aperture at the focal point of said lenses, and a light interrupter positioned in the path of light focused through said lenses toward said aperature, said light interrupter including a slot therein to pass light therethrough for a predetermined time, said predetermined time being sufficient to permit light passage from one end of said beam generator to said half-length laser and back through each of said laser sections again.

4. A high energy pulsed beam generator which comprises:

a plurality of axially aligned laser sections positioned in end-to-end spaced relationship on an optical axis, each of said laser sections except one end section including a cylindrical elongated laser element with the end faces parallel to each other and perpendicular to an axis through the ends, said one end section including a laser element one-half the length of the other of said laser elements, said half-length laser element comprising an inner end perpendicular to the axis through said laser elements and an outer end with a retro-prism, said retro-prism adapted to receive light from said inner end of said half-length laser and reflecting said light back through said half-length laser element and through said plurality of said laser sections, a pair of double-convex lenses positioned between each of said laser sections along the optical axis thereof, adapted to focus parallel radiation, an element positioned between said lenses at the focal point of each of said lenses, an aperture in said element with said aperture at the focal point of said lenses, and a light interrupter positioned in the path of light focused through said lenses toward said aperture, said light interrupter including a slot therein to pass light therethrough for a predetermined time, said predetermined time being sufficient to permit light passage from one end of said beam generator to said half-length laser and back through each of said laser sections again.

References Cited by the Examiner

UNITED STATES PATENTS 2,929,922   3/1960   Schawlow et al. _____ 88—1

OTHER REFERENCES

Bushor "Sun and Exploding Wires Pump Lasers," Electronics, vol. 35, No. 13, March 30, 1962, pp. 24 and 25.

Electronics, vol. 35, No. 32, page 8: "Traveling Wave," Laser Amplifies Light Image, Aug. 10, 1962.

Optical Society of America, Program, 42nd Meeting, Session TC, Thurs., Oct. 4, 1962: Koester et al., FA 17. "Interaction Between Two $Nd^{3+}$ Glass Lasers."

JEWELL H. PEDERSEN, *Primary Examiner.*

SAMUEL FEINBERG, *Examiner.*

V. R. PENDEGRASS, R. L. WIBERT,
*Assistant Examiners.*